United States Patent
Cavallaro et al.

(10) Patent No.: US 7,988,792 B2
(45) Date of Patent: Aug. 2, 2011

(54) AUTOMATIC EGG WASHING APPARATUS

(75) Inventors: David Cavallaro, W. St. Paul, MN (US); Stephen A. Morganson, W. St. Paul, MN (US)

(73) Assignee: CM Quantum Technologies, LLC, W. St. Paul, MN (US)

( * ) Notice: Subject to any disclaimer, the term of this patent is extended or adjusted under 35 U.S.C. 154(b) by 769 days.

(21) Appl. No.: 11/129,430

(22) Filed: May 13, 2005

(65) Prior Publication Data

US 2006/0254618 A1 Nov. 16, 2006

(51) Int. Cl.
- *B08B 3/00* (2006.01)
- *B08B 7/04* (2006.01)

(52) U.S. Cl. ............... 134/57 R; 134/94.1; 134/131; 134/56 R; 134/58 R; 134/18; 134/25.3

(58) Field of Classification Search ............ 134/18, 134/25.1, 25.3, 57 R, 94.1, 113, 131, 56 R, 134/58 R See application file for complete search history.

(56) References Cited

U.S. PATENT DOCUMENTS

| | | | |
|---|---|---|---|
| 3,447,176 A * | 6/1969 | Butterworth et al. | 15/3.11 |
| 5,634,397 A | 6/1997 | Hutchinson et al. | |
| 5,756,139 A * | 5/1998 | Harvey et al. | 426/298 |
| 5,868,859 A * | 2/1999 | Hei et al. | 134/18 |
| 6,032,311 A | 3/2000 | Nambu | |
| 6,821,353 B1 | 11/2004 | Kuhl | |
| 2004/0238017 A1 | 12/2004 | Kuhl | |

OTHER PUBLICATIONS

"Surfactants: Performance Chemicals: Pluronic & Tetronic", BASF Corporation (40 pages) (1999).

* cited by examiner

*Primary Examiner* — Alexander Markoff

(74) *Attorney, Agent, or Firm* — Pauly, DeVries Smith & Deffner, L.L.C.

(57) ABSTRACT

A method for automatically washing eggs by (a) dispensing a detergent-wetting agent mixture having a detergent concentration onto the eggs; (b) determining if the detergent concentration is at least a pre-set minimum, and going to step (a) if it is; (c) activating a detergent pump pumping at a rate; (d) activating a wetting-agent pump at $1/N^{th}$ the rate of the detergent pump, to form the detergent-wetting agent mixture; (e) determining if a pre-set interval has expired, and going to step (b) if it has not; otherwise (f) stopping the detergent pump and the wetting agent pump.

3 Claims, 3 Drawing Sheets

AUTOMATIC EGG WASHING APPARATUS

BACKGROUND OF THE INVENTION

The present invention relates to an apparatus and method for cleaning eggs.

There are four key aspects involved in virtually all egg cleaning operations. The four aspects are physical action, chemical action, temperature and time. While eggs can be soiled with virtually anything they come in contact with, the primary soils of concern are blood and feces. Prior to the establishment of large commercial egg cleaning operations, eggs were cleaned on farms, quite often with lye soap (sodium tallowate), water, and a small brush. The brush accomplished most of the removal physically. With the advent of compounded detergents the soap was replaced by detergents with formulas similar to 1 and 2 below.

| Ingredient | 1 % | 2 % |
|---|---|---|
| Alkyl benzene sulfonate | 15 | 15 |
| Sodium silicate | 7 | 7 |
| Sodium tripolyphosphate | 30 | 35 |
| Sodium pyrophosphate | 5 | — |
| Sodium carbonate | 43 | 30 |
| Sodium sulfate | — | 13 |
|  | 100% | 100% |

Such products were more effective than plain lye soap by virtue of superior wetting agents, higher alkalinity, and incorporation of builders like sodium tripolyphosphate into the formulas. With this change, the chemical aspect became a more significant aspect of the entire egg cleaning operation.

As centralized commercial egg cleaning operations developed, automatic egg washing machines came upon the scene. Such machines used pressurized water sprayed on the eggs to improve the physical aspect of soil removal. Under these conditions, the current egg cleaning formulas were not acceptable because the high foaming alkyl benzene sulfonate surfactants resulted in large amounts of foam flowing out of these machines. Nionic surfactants had to be substituted for the high foaming alkyl benzene sulfonate surfactants.

This was really when commercially compounded egg wash formulas became popular, because up until the development of automated egg washing machines standard off the shelf laundry detergents could be used quite effectively to clean eggs.

Formulas such as 3 and 4 shown below could be used in automatic machines.

| Ingredients | 3 % | 4 % |
|---|---|---|
| Triton CF54 | 4 | — |
| Antarox BL330 | — | 4 |
| Sodium silicate | 7 | 7 |
| Sodium tripolyphosphate | 30 | 30 |
| Sodium pyrophosphate | 5 | 5 |
| Sodium carbonate | 34 | 34 |
| Sodium sulfate | 20 | 20 |
|  | 100 | 100 |

Subsequently, it was determined that small amounts of sodium hypochlorite were quite effective at removing some soils, especially protein based soils such as albumin as well as blood and feces. Accordingly, some compounders made products containing powdered sodium hypochlorite doners such as sodium dichloro isocyanurate known commercially as ACL 60 and CDB 63. Several such formulas are shown below. (formulas 5-8)

| Ingredients | 5 % | 6 % | 7 % | 8 % |
|---|---|---|---|---|
| Triton CF54 | 4 | — | 4 | — |
| Antarox BL330 | — | 4 | — | 4 |
| Sodium Silicate | 7 | 7 | 7 | 7 |
| Sodium tripolyphosphate | 34 | 34 | 34 | 34 |
| Sodium cab bonate | 32 | 32 | 32 | 32 |
| Sodium sulfate | 20 | 20 | 20 | 20 |
| ACL 60 | 3 | — | 3 | — |
| CDB 63 | — | 3 | — | 3 |
|  | 100 | 100 | 100 | 100 |

With the advent of phosphate bans and limitations as well as cost pressures on large centralized commercial egg washing plants, compounders began selling both liquid and powered products based on caustic, sodium gluconate, and surfactants in the case of powders. Unfortunately surfactants cannot be coupled into highly concentrated caustic liquids because of the exceptionally high salt content. Several such powered and liquid products are shown below. (formulas 9-14)

| | Powdered | | | |
|---|---|---|---|---|
| Ingredient | 9 % | 10 % | 11 % | 12 % |
| Sodium carbonate | 5 | — | 5 | — |
| Sodium tripolyphosphate | — | 5 | — | 5 |
| Antarox BL 330 | 1 | 1 | — | — |
| Triton CF 54 | — | — | 1 | 1 |
| Caustic bead | 94 | 94 | 94 | 94 |
|  | 100 | 100 | 100 | 100 |

| | Liquid | |
|---|---|---|
| Ingredient | 13 % | 14 % |
| Caustic 50% | 98 | 96 |
| Gluconic Acid 50% | 2 | 4 |
|  | 100 | 100 |

Liquid products do not contain surfactants, and while some egg cleaning operations use these relatively inexpensive formulas, the lack of surfactant is a performance weakness. Some plants add surfactant manually. However, concentrations are very difficult to control since water is continually being added and removed from the machines during operation.

The strength of powdered formulas such as 9-12 is that they are complete formulas and have all the necessary ingredients for optimum performance. The weaknesses are that as powders, they are difficult to dispense quantitatively and cannot be used effectively with a detergent sensing controller. In addition, caustic bead is a more expensive source of alkali than 50% liquid caustic because of the energy required to remove the water.

The strength of the liquid formulas is that the alkali source is 50% commodity caustic, which is the most economical source of alkali known. In addition, they can be easily dispensed quantitatively and thus can be used in conjunction with a detergent sensing controller. Their weakness is that they are not complete products because they do not contain effective wetting agents.

These formulas, when properly used, have proved reasonably effective in many plants. The sodium gluconate is a builder used to sequester calcium and improve the performance of the detergent. However, these products were not designed for egg washing. They were used because they were reasonably effective and very inexpensive.

They were originally designed as bottle washing cleaners and boil out compounds used for cleaning large stainless steel groens in food processing plants. The typical use concentrations were 1-2% (10,000-20,000 ppm). Sodium gluconate is a highly effective builder in 1-2% caustic solutions with a calcium stability complex of over 20. However, at egg washing ph's 10-11 the calcium stability complex falls to 2-3. Good effective builders have calcium stability complexes of 6 minimum. Thus sodium gluconate is virtually ineffective in egg washing operations.

In addition, these formulations are used at much lower levels in egg washing (about 2,000 ppm in egg washing versus 20,000 ppm in bottle washing or boil out compounds).

Thus in egg washing applications, there would be about 40 ppm of sodium gluconate verses 400 ppm of sodium gulconate in bottle washing or boil out applications. The point is that formation of the sodium gluconate calcium complexes is a stochiometric reaction and even if sodium gluconate did effectively sequester calcium in egg washing formulations it would only handle 1.6 grains of hardness which is much less then the water hardness of most egg washing operations.

On the other hand, bottle washing and boil out applications where sodium gluconate is very effective can handle 13 grains of water hardness.

Finally, sodium gluconate forms a soluble calcium complex. This prevents calcium from reacting with $CO_2$ in the wash water and forming calcium carbonate spots and films which are easily noticed on glass and stainless surfaces. When calcium carbonate films or spots form on egg surfaces which are made of calcium carbonate and are opaque to start with, they are not visible so less objectionable.

Based on the aforementioned discussion and the fact that caustic/gluconate formulas have been shown effective in many egg washing operations, commodity caustic can be used in egg washing applications with equal performance to caustic/gluconate formulas. In both cases a low foaming wetting agent is required for optimum performance.

The low foaming wetting agent Applicants feel is the optimum product for egg washing is a product supplied by BASF known as Pluronic 25R2. This is a reverse pluronic block polymer. The center of the polymer is comprised of water soluble polyoxyethylene. The ends are capped with oil soluble polyoxypropylene which gives it its low foaming properties that are so important for egg washing operations. It is also highly effective at reducing the surface tension of water, thus providing excellent wetting properties.

While there are other low foaming wetting agents which are comparable to Pluronic 25R2 the type of wetting agent is not as critical as getting the correct concentration in egg washing machines. Low foaming wetting agents cannot be incorporated in 50% caustic solutions because they are not soluble in high salt solutions. Thus it is necessary to add the low foaming wetting agents independently. This is further complicated by the fact that low foaming wetting agents are organic and nonconductive in nature. Thus they cannot be dispended via a conductivity sensing system.

Most large egg washing machines are continuous cleaning machines. In order to run continuously, water must be replaced on a continuous basis in order to keep the soil load low enough for effective cleaning. This is accomplished by spraying fresh rinse water containing sodium hypochlorite sanitizer over the eggs in the final phase of the cleaning procedure. This fresh rinse water flows off the eggs and into the tank containing the wash water. Old dirty wash water flows through the opening of a standpipe located at the opposite end of the wash water tank. As a result, the detergent in the wash water is continuously being depleted because it is going down the standpipe and ultimately down the drain with the dirty water. Since detergents are primarily electrolytes, conductivity is proportional to the amount of detergent in the wash water. In continuous wash systems this principle can be used to maintain the proper detergent concentration. This can be done by inserting a two-pronged probe in the wash water tank, putting a voltage across the probes, and measuring conductivity. When the conductivity decreases below a certain level and indicates a low detergent concentration, the signal goes to a pc board which activates the detergent pump until the conductivity indicates the desired detergent concentration is achieved and the pump is deactivated.

Such systems have been tried in egg washing machines but have not been able to survive the environment for more than a few hours because the probes become coated with calcium, albumin, and other soils which render them ineffective. However, similar systems based on a fully enclosed inductance coil in lieu of an electronic probe have been shown to be highly effective at measuring detergent concentrations in the environment of egg washing machines.

Empty drum alarms are often based on a float switch at the bottom of the drum probe. These are not always trouble-free, sometimes sticking and failing to activate, thus requiring replacement from time to time. In addition, they may require that cumbersome wiring be attached to the drum probe.

There is a need for an automatic egg washing apparatus that overcomes these problems.

SUMMARY OF THE INVENTION

An apparatus and method for automatically washing eggs, includes: a source of detergent; a source of wetting agent; a detergent pump connected to the source of detergent; a detergent concentration-sensing mechanism; a wetting agent pump connected to the source of wetting agent and to the detergent concentration-sensing mechanism and synchronized with the detergent pump to dispense wetting agent at a predetermined rate relative to the rate at which the detergent pump dispenses detergent; a re-circulating pump for combining the detergent from the detergent pump and the wetting agent from the wetting agent pump to form a detergent-wetting agent mixture; a sprayer for spraying the detergent-wetting agent mixture onto the eggs; and a holding tank receiving detergent-wetting agent mixture after the detergent-wetting agent mixture has been sprayed on the eggs; The re-circulating pump has an input tube connected to the holding tank and an exit connected to the sprayer.

A principal object and advantage of the present inventions that the inductance controlling dispenser maintains concentration of both detergent and wetting agent and eliminates over use and under use of both products.

Another principal object and advantage of the present invention is that the use of commodity caustic eliminates going through a compounder which results in large manufacturing, shipping, and profit related up charges.

Another principal object and advantage of the present invention is that Pluronic 25R2 can be purchased less expensively than other wetting agents.

Another principal object and advantage of the present invention is that the dispenser will bring both detergent and low foaming wetting agent to the optimum concentrations and maintain optimum concentrations automatically with no need for handling hazardous chemicals or measuring dosages.

Another principal object and advantage of the present invention is that there is no need for handling hazardous chemicals. Detergents in particular are highly alkaline and therefore particularly hazardous.

Another principal object and advantage of the present invention is that the system is fully automatic. There is no need for feeding or dosing detergent or low foaming wetting agents in the middle of a cleaning shift.

Another principal object and advantage of the present invention is that caustic is generally not a problem and is usually neutralized before leaving the plant. While wetting agents are used at very small concentrations the controller will reduce their level in the effluent. One test indicated an 80% reduction.

Another principal object and advantage of the present invention is that the low foaming wetting agent concentration is fully controlled. Low concentrations can of course result in foaming. High concentrations can actually emulsify soils in the wash water and stabilize the foam. Both conditions are eliminated with this system resulting in more consistent foam control.

DETAILED DESCRIPTION OF THE PREFERRED EMBODIMENT

Figure 1:
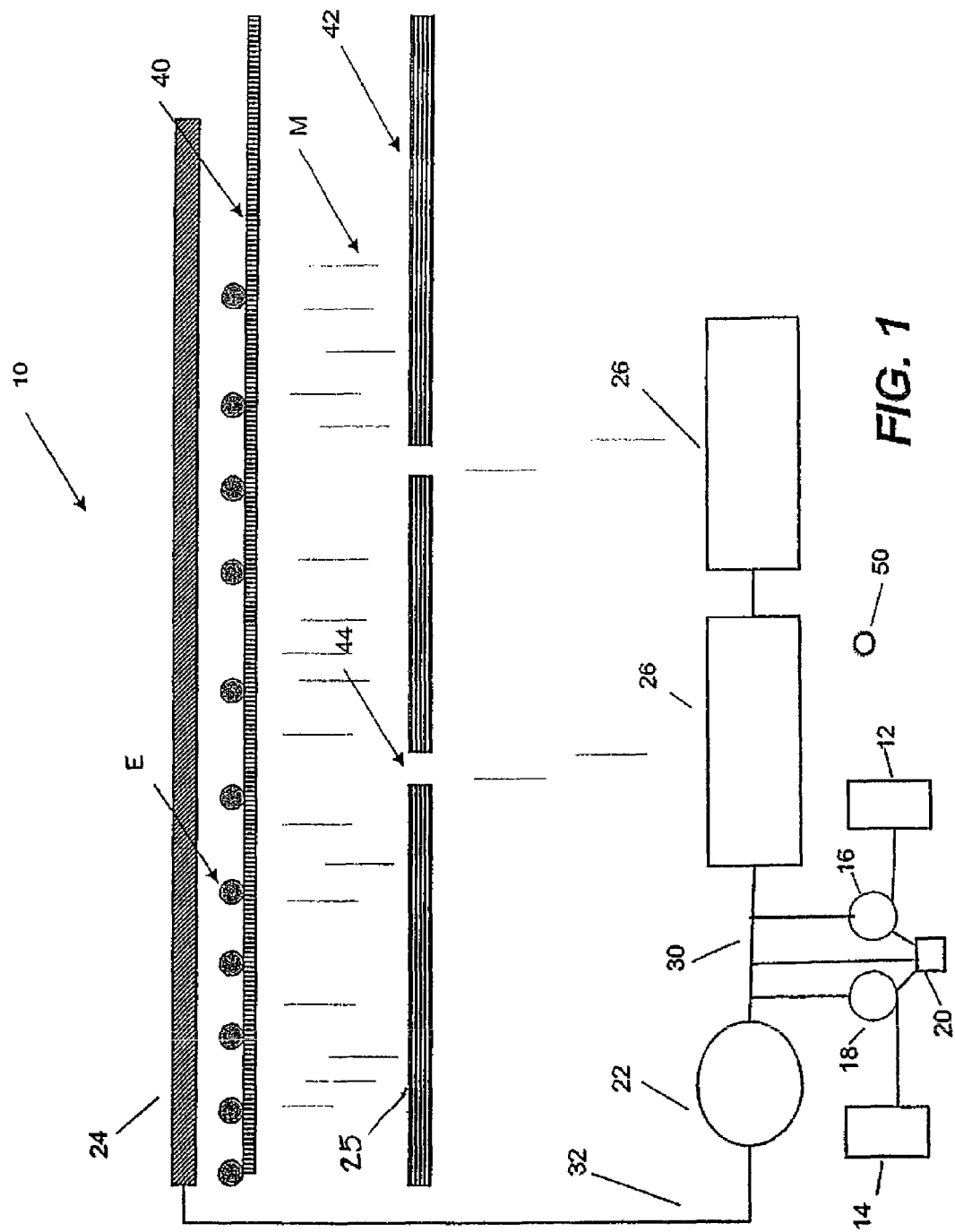
FIG. 1 is a block diagram of the apparatus of the present invention.

In one aspect, the present invention is an apparatus 10 for automatically washing eggs E, comprising a source of detergent 12, a source of wetting agent 14, a detergent pump 16 connected to the source of detergent, a detergent concentration sensing mechanism 20, and a wetting agent pump 18 connected to the source of wetting agent 14 and to the detergent concentration-sensing mechanism 20.

The wetting agent pump 18 is synchronized with the detergent pump 16 to dispense wetting agent at a predetermined rate relative to the rate at which the detergent pump dispenses detergent.

The apparatus 10 further comprises a re-circulating pump 22 for combining the detergent from the detergent pump 12 and the wetting agent from the wetting agent pump 14 to form a detergent-wetting agent mixture M.

The apparatus 10 further comprises a sprayer 24 for spraying the detergent-wetting agent mixture onto the eggs E.

The apparatus 10 further comprises a holding tank 26 receiving detergent-wetting agent mixture after the detergent-wetting agent mixture has been sprayed on the eggs E. The re-circulating pump has an input tube 30 connected to the holding tank 26 and an exit 32 connected to the sprayer 24.

Preferably, the detergent is an alkali, such as sodium hydroxide, which can be detected through its ionization in water. Most preferably, the detergent is a 50% sodium hydroxide solution.

Preferably, the wetting agent is a low-foam wetting agent to prevent foam forming during the egg cleaning process. Most preferably, the wetting agent is a reverse pluronic block polymer having a center comprised of water-soluble polyoxyethylene and end caps comprised of oil soluble polyoxypropylene, such as the Pluronic 25R2 agent discussed above.

For most efficient cleaning, the ratio of detergent to wetting agent in the detergent-wetting agent mixture M is preferably about 36 to 1.

Suitably, the eggs E may be transported through the apparatus 10 on a conveyor 40. In some embodiments, the detergent-wetting agent mixture M may, after dripping off the eggs E, fall onto an intermediate shelf, barrier, or lid 42 which has openings 44 therein for guiding the mixture M into the holding tank or tanks 26.

In the preferred embodiment, the detergent concentration-sensing mechanism 20 further comprises an inductance probe 24. The inductance probe 24 should have a fully enclosed inductance coil in order to prevent the coil from becoming coated with calcium, albumin, and other soils.

Figure 2:
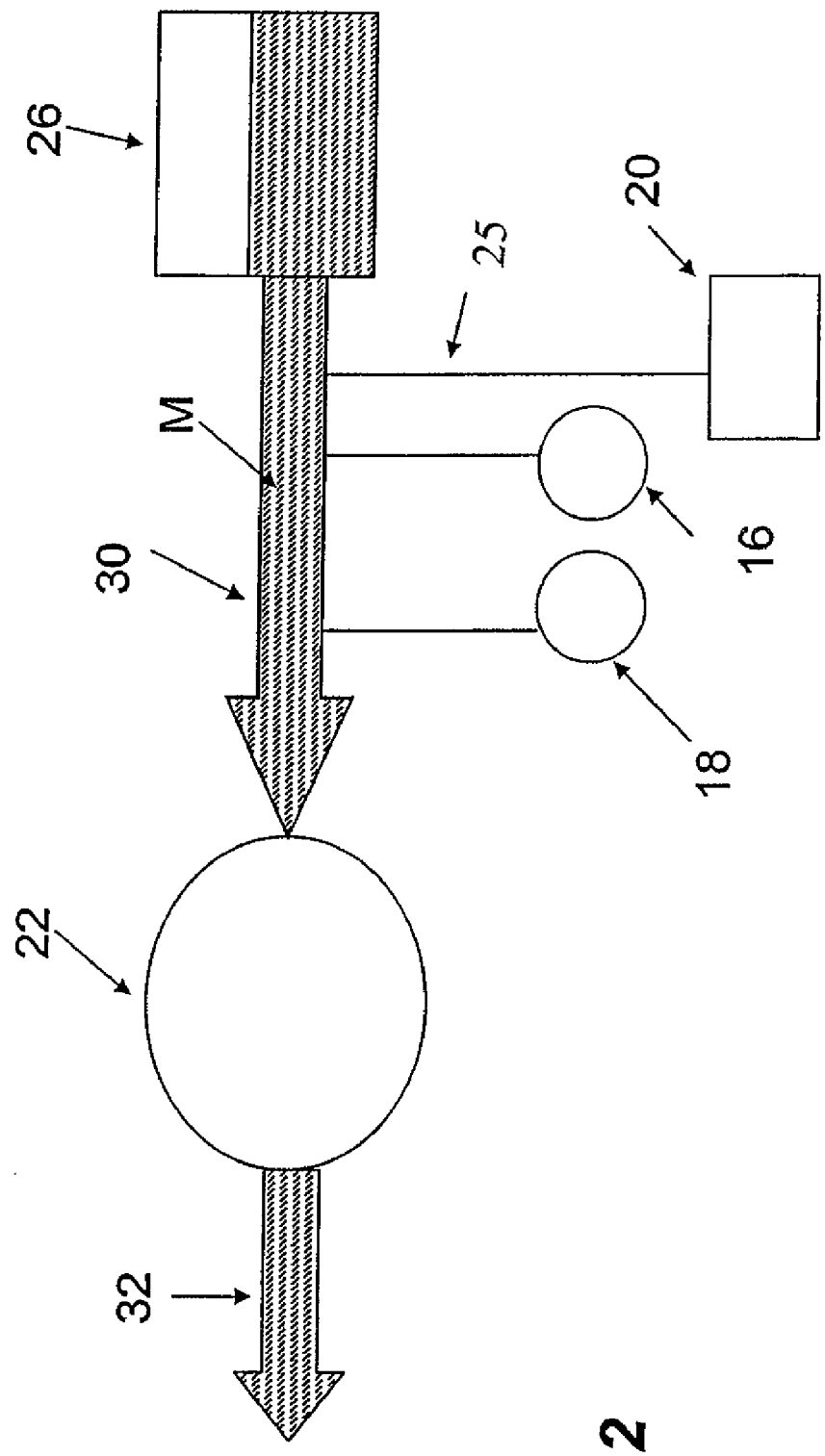
FIG. 2 is a detailed block diagram of part of the apparatus of FIG. 1.

Most preferably, as shown in FIG. 2, the detergent pump 16 should be connected to the input tube 30 between the holding tank 26 and the point at which the wetting agent pump 18 is connected to the input tube 30 and the inductance probe is also connected to the input tube 30 before the point at which the detergent pump 16 is connected to the input tube 30. These placements are important to insure quick and thorough disbursement of the wetting agent and detergent and for the inductance probe 24 to get accurate, consistent, and realistic conductivity readings. The wetting agent pump 18 should be connected to the input tube 30 about 2 to 4 inches before the re-circulating pump 22. The detergent pump 16 should be connected to the input tube 30 about 4 to 6 inches before the re-circulating pump 22. The inductance probe 24 should be connected to the input tube 30 about 4 to 6 inches before the point at which the detergent pump 16 is connected to the input tube 30. With mixture M from the holding tank 26 flowing towards the re-circulating pump 22, this will ensure that concentrated incoming detergent does not migrate towards the probe 24, which could result in inaccurately high conductivity readings.

The inductance probe 24 could also be connected to the exit 32 of the re-circulating pump 22, but this would require that an adequate shut-off delay be programmed into the pumps 14 and 16 to obtain sufficient pumping times.

The apparatus 10 may preferably further comprise an empty detergent source indicator 50 activated when the detergent pump 16 has been activated a predetermined number of times and the detergent concentration-sensing mechanism 20 detects no increase in detergent concentration in the input tube 30. Preferably, the indicator 50 is a light on the source of detergent 12 (such as a drum) that will direct the operator to replace the source of detergent 12 or re-fill it.

Operation of the apparatus 10 is as follows.

During initial fill of the apparatus 10, the re-circulating pump 22 is turned on. The detergent pump 16 and wetting agent pump 18 are then activated and will continue to pump intermittently until the desired detergent concentration is sensed by the inductance probe 24 (conductivity measurement). From then on, the pumps 16 and 18 will be activated each time the detergent concentration in the input tube 30 falls below a pre-set level. Because optimally the detergent pump 16 pumps at a rate of 36 times that of the wetting agent pump

18, and both are activated for identical times, the detergent concentration in the mixture M will be 36 time that of the wetting agent. For example, if the detergent concentration is set to a minimum of 1800 ppm, the wetting agent concentration will be 50 ppm.

Optimally, the pumps 16 and 18 do not run continuously while the inductance probe 24 senses low conductivity. Instead, the pumps 16 and 18 are preferable activated for a pre-set activation time. After a pre-set interval, another conductivity reading from the probe 24 is taken. The pumps will only be re-activated if the conductivity reading is still too low. By having a pre-set activation time, large over-shoots can be avoided and much greater accuracy in maintaining both detergent and wetting agent concentrations can be achieved.

Figure 3:
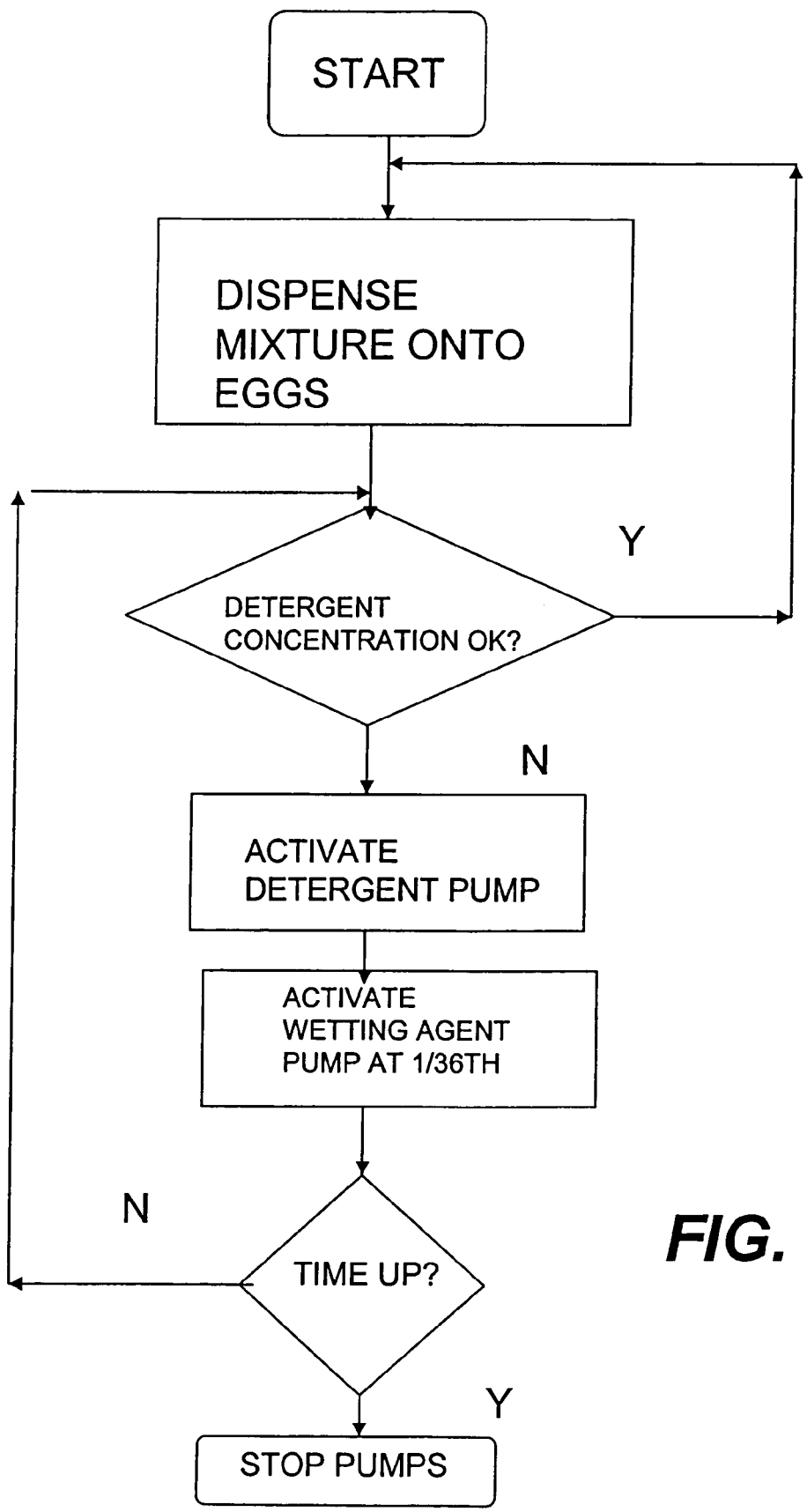
FIG. 3 is a flowchart of the method of the present invention.

In another aspect (FIG. 3), the present invention is a method for automatically washing eggs, comprising the steps of:

(a) dispensing a detergent-wetting agent mixture onto the eggs;

(b) determining if the detergent concentration is at least a pre-set minimum, and going to step (a) if it is;

(c) activating a detergent pump;

(d) activating a wetting-agent pump at 1/Nth the rate of the detergent pump, to form a detergent-wetting agent mixture;

(e) determining if a pre-set interval has expired, and going to step (b) if it has not; otherwise (f) stopping the detergent pump and the wetting agent pump.

The method may further comprise a step of activating an empty detergent source indicator when the detergent pump has been activated a predetermined number of times and the detergent concentration has not increased.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method for automatically washing eggs, comprising the steps of:

dispensing a detergent-wetting agent mixture onto the eggs through a sprayer by an apparatus that separately dispenses an aqueous electrolyte alkaline detergent and a wetting agent to form the mixture, the apparatus comprising:

a holding tank containing the mixture;

a circulation pump having an input tube connected to the holding tank and an exit connected to the sprayer;

a detergent pump for dispensing the aqueous electrolyte alkaline detergent into the input tube; and (c) a wetting agent pump for dispensing the aqueous wetting agent into the input tube;

wherein the mixture in the holding tank is continuously circulated through the input tube and sprayer and maintained at a substantially constant effective cleaning concentration of electrolyte alkaline detergent and aqueous wetting agent by dispensing the aqueous electrolyte alkaline detergent and the wetting agent into the input tube; and wherein the detergent pump is controlled by a probe that measures the concentration of the electrolyte alkaline detergent in the input tube and the detergent pump is synchronized with the wetting agent pump and the aqueous electrolyte alkaline detergent and wetting agent are dispensed into the input tube at a predetermined ratio.

2. The method of claim 1, wherein the predetermined ratio is about one part by volume of the aqueous wetting agent per each thirty six parts by volume of the aqueous electrolyte alkaline detergent.

3. The method of claim 1, wherein the probe comprises an inductance probe.

* * * * *

UNITED STATES PATENT AND TRADEMARK OFFICE
CERTIFICATE OF CORRECTION

PATENT NO. : 7,988,792 B2  Page 1 of 1
APPLICATION NO. : 11/129430
DATED : August 2, 2011
INVENTOR(S) : Cavallaro et al.

It is certified that error appears in the above-identified patent and that said Letters Patent is hereby corrected as shown below:

Col. 8, line 22, claim 1: "(c) a wetting agent pump" should read --a wetting agent pump--

Signed and Sealed this
Twenty-first Day of February, 2012

David J. Kappos
*Director of the United States Patent and Trademark Office*